(12) United States Patent
Wellen et al.

(10) Patent No.: US 9,009,770 B2
(45) Date of Patent: Apr. 14, 2015

(54) METHODS AND SYSTEMS FOR MEDIA CONSUMPTION

(75) Inventors: Alex Wellen, Atlanta, GA (US); David Bohrman, Cloverdale, CA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 543 days.

(21) Appl. No.: 12/944,571

(22) Filed: Nov. 11, 2010

(65) Prior Publication Data
US 2012/0124630 A1   May 17, 2012

(51) Int. Cl.
| | |
|---|---|
| H04N 7/173 | (2011.01) |
| H04N 21/482 | (2011.01) |
| H04N 21/433 | (2011.01) |
| H04N 21/81 | (2011.01) |
| H04N 21/41 | (2011.01) |

(52) U.S. Cl.
CPC ....... *H04N 21/4828* (2013.01); *H04N 21/4334* (2013.01); *H04N 21/8133* (2013.01); *H04N 21/4135* (2013.01)

(58) Field of Classification Search
USPC .......................................................... 725/109
See application file for complete search history.

(56) References Cited

U.S. PATENT DOCUMENTS

| | | | |
|---|---|---|---|
| 7,373,650 B1 * | 5/2008 | Rodriguez et al. .............. 725/41 |
| 7,676,138 B2 | 3/2010 | Blackletter et al. ............. 386/68 |
| 2002/0059602 A1 * | 5/2002 | Macrae et al. .................. 725/42 |
| 2002/0152245 A1 * | 10/2002 | McCaskey et al. ........... 707/530 |
| 2004/0088328 A1 * | 5/2004 | Cook et al. .................. 707/104.1 |
| 2005/0177850 A1 | 8/2005 | Boylan, III et al. ............. 725/53 |
| 2005/0278747 A1 | 12/2005 | Barton et al. .................... 725/58 |
| 2008/0271080 A1 * | 10/2008 | Gossweiler et al. ............ 725/47 |
| 2009/0025034 A1 * | 1/2009 | Modiri et al. .................... 725/43 |

(Continued)

FOREIGN PATENT DOCUMENTS

WO    WO 2010/025048 A2    3/2010

OTHER PUBLICATIONS

"Facebook Modern Family" website. Retrieved Oct. 4, 2013. www.facebook.com/ModernFamily.*

(Continued)

*Primary Examiner* — John Schnurr
*Assistant Examiner* — Cynthia Fogg
(74) *Attorney, Agent, or Firm* — Winston & Strawn LLP

(57) ABSTRACT

Methods and apparatus for increasing media consumption are disclosed. The present invention can provide viewers increased access to content of interest across various platforms, such as online articles, online audio and video clips, and television and radio broadcasts. In an embodiment, an individual viewing content online, such as a news article, is given a link. The link provides the viewer access to a list of content related to the article being viewed. The related content is not limited to the platform related content across, and allows the user to view the content, automatically set the content to be recorded by a digital video recorder, or reserve the content for future viewing. Accordingly, by providing the user with convenient access to content across platforms, based on their interests, they are more given media content they are more likely to enjoy. Accordingly, viewership of this content will increase, through this connection of individuals with content that aligns with their interests.

21 Claims, 14 Drawing Sheets

(56) References Cited

U.S. PATENT DOCUMENTS

2009/0119701 A1 5/2009 Aldrey et al. .................. 725/32
2009/0328108 A1 12/2009 Hanai ............................ 725/53
2010/0057469 A1 3/2010 Jeffs ............................ 704/275
2010/0057583 A1 3/2010 Jeffs et al. ...................... 705/26
2010/0242076 A1* 9/2010 Potesta et al. ................ 725/109
2010/0275233 A1* 10/2010 Soohoo et al. ................. 725/46
2010/0306708 A1* 12/2010 Trenz et al. ................... 715/853

OTHER PUBLICATIONS

International Search Report and Written Opinion of the International Searching Authority, application No. PCT/US2011/059939, mailed Sep. 20, 2012.

Invitation to Pay Additional Fees and Partial Search Report mailed May 15, 2012 for International Application No. PCT/US2011/059939.

* cited by examiner

Fig. 3 www.cnn.com/entertainment

Oprah Winfrey: This show has been my life
By: CNN Staff Writer

Considering how often many of us have to reach for tissue while watching "The Oprah Winfrey Show," the host is actually hoping to remain relatively dry-eyed during her last season.

"I don't intend to be crying the whole season," Winfrey told TV Guide. "The only time I get really emotional and nostalgic about the show is when I think about the viewers. Hopefully some of them will follow me to OWN, but I know not everybody will."

Winfrey added that "the show hasn't been a big part of my life. It's been my life. I didn't have children. I had the show."

Yet as of January 1, Winfrey will move on to her OWN network, and as a result, the 56-year-old media mogul told TV Guide that she's got different standards for her guests for the upcoming 25th season - "this year will be about creating moments," she said.

Related TV Prog.

Larry King Live – Featuring Oprah –CNN –7/12, 2010, 11 p.m.

The Modern Talk Show – How Did America Get Hooked? - The History Channel – 8/22/2010, 9 p.m.

Related Radio Prog.

Talk of the Nation – Is Oprah Replaceable? – 98.8 National Public Radio - 8/22/2010, 9 a.m.

301
302
303

Fig. 7 www.cnn.com/entertainment | 701

Oprah Winfrey: This show has been my life
By: CNN Staff Writer

Considering how often many of us have to reach for tissue while watching "The Oprah Winfrey Show," the host is actually hoping to remain relatively dry-eyed during her last season.

"I don't intend to be crying the whole season," Winfrey told TV Guide. "The only time I get really emotional and nostalgic about the show is when I think about the viewers. Hopefully some of them will follow me to OWN, but I know not everybody will."

Winfrey added that "the show hasn't been a big part of my life. It's been my life. I didn't have children. I had the show."

Yet as of January 1, Winfrey will move on to her OWN network, and as a result, the 56-year-old media mogul told TV Guide that she's got different standards for her guests for the upcoming 25th season - "this year will be about creating moments," she said.

Related TV Prog.

Larry King Live – Featuring Oprah –CNN –7/12, 2010, 11 p.m.   [SET]  [BLAST]

The Modern Talk Show – How Did America Get Hooked? - The History Channel – 8/22/2010, 9 p.m.   [SET]  [BLAST]

Related Radio Prog.

Talk of the Nation – Is Oprah Replaceable? – 98.8 National Public Radio - 8/22/2010, 9 a.m.   [SET]  [BLAST]

Fig. 14

Media Queue

Television Content

| Program | Channel | Date and Time | SetDVR | Blast |
| --- | --- | --- | --- | --- |
| Larry King Live – Featuring Oprah Winfrey | CNN | 7/12/2010 – 11 p.m. | SET | BLAST |
| The Modern Talk Show – How Did America Get Hooked? | History | 8/20/2010 – 9 p.m. | SET | BLAST |

Radio Content

| Program | Station | Date & Time | Blast |
| --- | --- | --- | --- |
| Talk of the Nation – Is Oprah Replaceable? | 98.8 National Public Radio | 8/22/2010 – 9 a.m. | BLAST |

US 9,009,770 B2

METHODS AND SYSTEMS FOR MEDIA CONSUMPTION

FIELD OF THE INVENTION

The present invention generally relates to media consumption and in particular, to integration of media across platforms.

BACKGROUND ART

Individuals seeking information or entertainment are presented with media on a number of platforms, including online, on television, radio, and mobile devices. Although this media may be provided in different formats, it is often times related in nature. An individual who views content covering a specific topic will most likely be interested in additional media covering the same or related topics. At present, there exists no method for an individual viewing content on one specific topic to identify and automatically arrange to consume and record related content across platforms.

SUMMARY OF THE INVENTION

Methods and apparatus for linking, aggregating, and automatically recording related media are provided. In recent years, news, current events, and reference materials have become available on several platforms, including online, on television, radio and on applications for mobile devices. In accordance with embodiments of the present invention an individual consuming media on any of these platforms can easily be allowed to easily gain easy access to materials in which they may be interested on other platforms. Accordingly, viewership across platforms will be increased, and television and radio ratings will rise.

In accordance with the principles of the present invention, a method for integrating and aggregating media across platforms may be provided. An individual viewing a news article online, consisting of text and pictures, is provided related content, such as television shows, radio programs, mobile content and online audio and video content which may be of interest to the viewer. The additional media may be identified based upon the topic of the original news article or various other criteria. The link may also identify the location of related content, such as the webpage or the broadcast channel and time. By providing this information to an individual, the likelihood that they will view the related content is increased.

In addition, systems and methods can be provided which allow an individual viewing content on a first platform to use a link to automatically set their digital video recorder (DVR) to record content on a second platform, such as a television program related, to the content on the first platform. In addition, other recording facilities may be used, including for the purpose of recording content on platforms other than television.

Systems and methods are further provided to allow an individual to suggest media content to members of a social network. The members of the social network are provided to the opportunity to seamlessly set their DVR to record the suggested content, or to save the content to their media queue for viewing at a later time.

In addition, systems and method can be provided to aggregate all of the content suggested to a user across all platforms to a media queue. This media queue allows the user to return to view or record content at a later time, or to receive updates on newly available or updated media.

BRIEF DESCRIPTION OF THE DRAWINGS

Other aspects, purposes, and advantages of the invention will become clear after reading the following detailed description with reference to the attached drawings, in which:

FIG. 3 illustrates an online news article which provides the user access to related content across platforms, in accordance with an embodiment of the invention;

FIG. 7 illustrates an online news article which suggests matching programs and contains a user-selectable option to create a recording of a suggested program, in accordance with an embodiment of the invention be provided to the user in accordance with an embodiment of the invention;

FIG. 14 illustrates the aggregation of related content in accordance with an embodiment of the present invention.

DETAILED DESCRIPTION OF THE PREFERRED EMBODIMENTS

Figure 1:
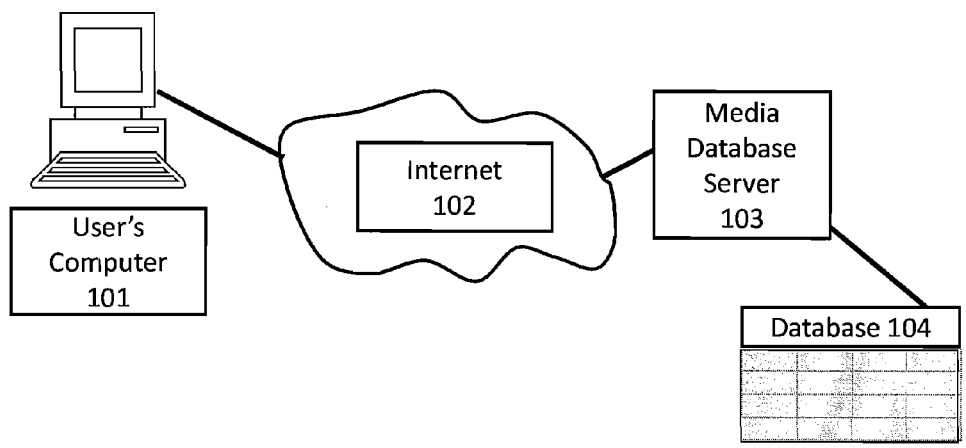
FIG. 1 illustrates a network for user access to media, in accordance with an embodiment of the invention.

FIG. 1 depicts a network in accordance with the some embodiments of the present invention. The user's computer 101 has access to the Internet 102, through an Internet service provider, such as a cable company or telephone company, which may provide high speed Internet, digital subscriber line, or a similar service. The Internet provides the user access to a large amount of content including online news articles, such as those posted at CNN.com. In addition, Media Database Server 103 which recommends media content to users is connected to Internet 102. Media Database Server 103 connects to database 104, which contains information relating to media across multiple platforms, including online, television broadcasts, radio programs and media for mobile devices such as smart phones. The information in database 104 includes details necessary to consume each piece of media content, including date and time the program will be broadcast, the channel providing the content. In the case of Internet media, database 104 houses details such as the uniform resource locator address, or URL, assigned to the content, as well as the content provider. It should be understood that Media Database Server 103 can consist of a single server or multiple servers, and similarly, database 104 can reside on a single server, or can sit across numerous servers.

Figure 2:
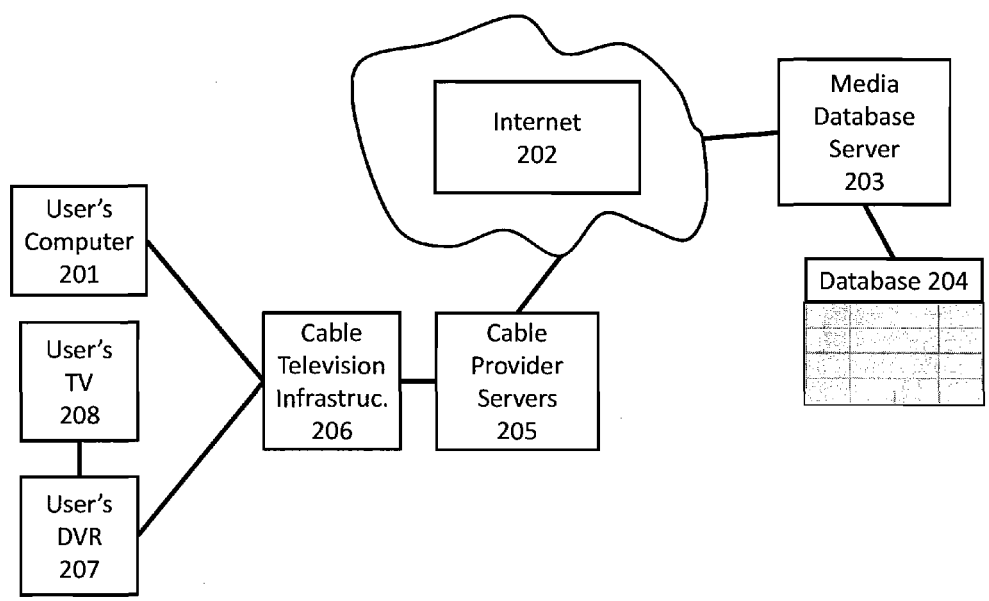
FIG. 2 illustrates a network in which a cable provider gives the user access to the Internet and television broadcasts in accordance with an embodiment of the invention.

FIG. 2 depicts a network in accordance with some embodiments of the present invention in which both television broadcasts and Internet access are provided to the user through the cable company. In this instance, the user's computer 201, gains access to the Internet through cable provider servers 205. In addition, cable television infrastructure 206, such as cabling and fiber optic lines, brings both cable television signals and Internet based data to the user. This may allow the user's computer 201, and digital video recorder ("DVR") 207, to have access to the Internet. The DVR 207 relays a cable signal to the user's television 208 for live broadcast of television programs. In addition, the DVR may also record television programs, allowing the user to view them at a time after they have originally aired. The digital video recorder consists of processors and memory which allow it to interpret record and later recall a cable signal. In addition, it should be noted that additional configurations, in which the digital video recorder does not relay a cable signal to the television, but merely has access to the cable signal, either through a splitter or similar means, may be used. In those instances, since the DVR is still capable of recording television programs, time-shifting the viewing of programs or aggregating programs for viewing by a user, it can still be used in accordance with embodiments of the present invention. In addition, a DVR can be local to the user, such as on the user's premises, or remotely located, such as on the premises of the cable or satellite provider.

FIG. 3 depicts a news article that may be viewed online by a user, using a standard Internet browser. The article 301 may deal with news, current events, or any other content in which a user may be interested. In addition, article 301 can come in the format of a news article, blog, an online discussion in which users may comment, or any other content available on the Internet. Article 301 can be accessed using a computer, smart phone, or any other device capable of accessing the Internet and displaying web content. Alongside article 301, related content 302 provides a display or content from other platforms, such as television and radio that may be of interest to the user based upon their interest in article 301. The related content may be queried from a database using various criteria, including the topic of article 301, subtopics related to article 301, key words such as key word 303. Since the user is accessing article 301 using the Internet, the system may also utilize the user's Internet Protocol address (IP address) or other indicia in suggesting programs. For example, the IP address can be used to suggest a particular time of broadcast that matches the user's area (e.g., time zone). One object is to suggest television programming that the user does not know about solely from viewing the currently displayed content. For example, the online content may be directed to, or discuss, some non-program specific topic. The present tools can inform the user of a related program so that they can further consume a program related to that topic.

Figure 4:
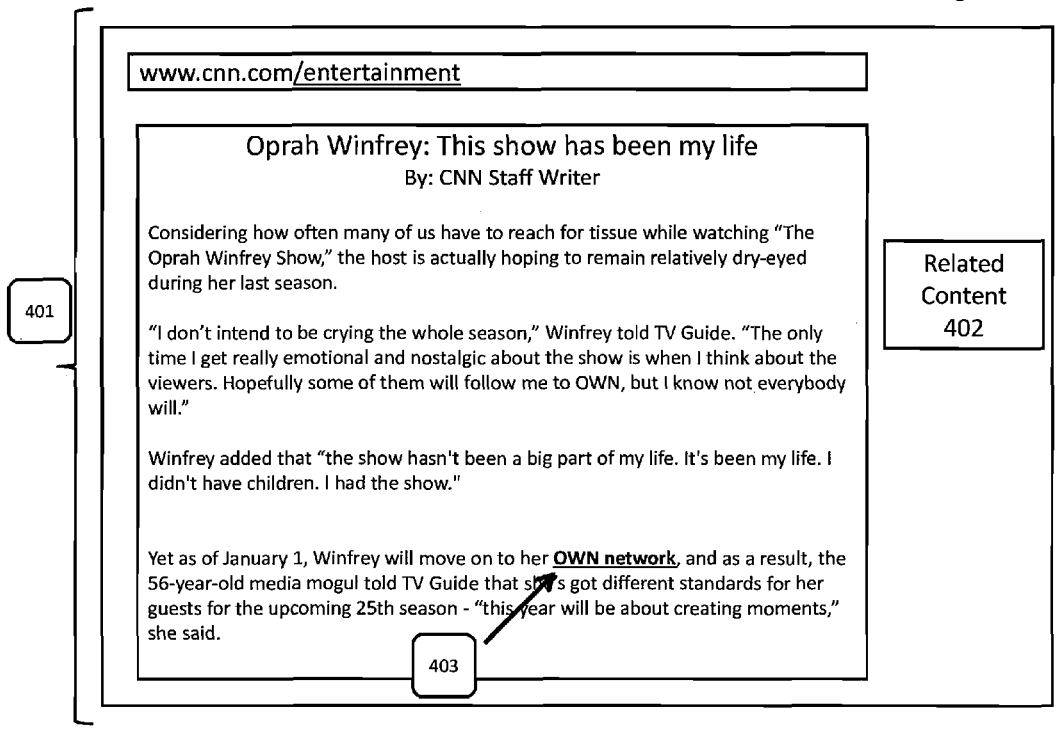
FIG. 4 illustrates an online news article which provides the user access to related content across platforms, in accordance with an embodiment of the invention.

FIG. 4 depicts an additional method of providing related content in accordance with an embodiment of the invention. In this particular implementation, the user explicitly requests to see related content. Alongside article 401 is button 402. Button 402 may be a button, or any other equivalent interface allowing a user to make a selection, such as a link, icon, radio button, drop down box, a hot key, or a menu option made available when the user right clicks his/her mouse. In addition, the interface for selection can be placed in the same Internet browsing window as article 401, in an additional tab, a menu in the browser, a dashboard, or any other place which allows the user make a selection from their computer or Internet capable device. Upon selecting button 402, the user is provided access to related content, media content across various platforms that is determined to be of potential interest to the user based on his interest in article 401. For example, a user that selects button 402 will receive related content comprising television programs, radio broadcasts, and mobile device content, all of which relates in some manner to article 401. In addition, the user can be provided embedded links such as 403. Selection of such embedded links can provide the user access to related content for the specific term that has been linked, or can be used to further refine the related content chosen for the user in relation to the topic of article 401.

Figure 5:
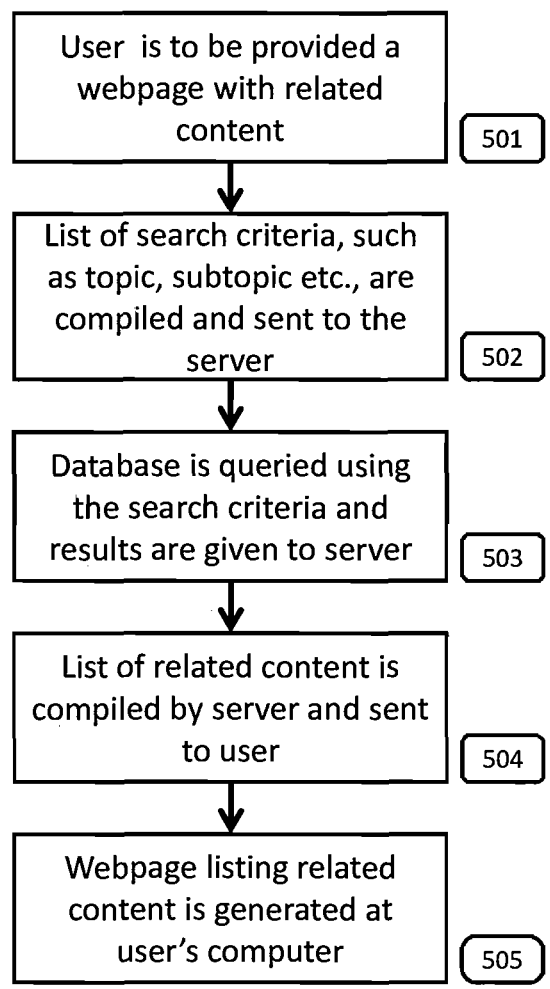
FIG. 5 is a flow chart of illustrative steps involved in obtaining related content across platforms, in accordance with an embodiment of the invention.

Illustrative steps involved in providing related content to the user are depicted in FIG. 5. At step 501, a user is to be provided with a display of related content. This can occur because the original web article is to be accompanied by a display of related content, or because the user has selected an option to receive related content. At step 502 a set of search criteria is assembled. Step 502 may occur at the user's computer, or at a remote server, such as Media Database Server 103 (FIG. 1). In addition, portions of the search criteria, such as a user profile, or topics related with an article may reside on the remote server, as opposed to the user's computer. After this information is compiled the database is queried at step 503. This query can be implemented in many manners, including use of a SQL database and query. At step 504, a set of related content, such as television programs, radio broadcasts and mobile device content is determined. This content is provided to the server and then relayed to the user at step 505. It should be acknowledged that the format in which the related content is presented can be determined at the server, or at the user's computer. In addition, in the case that a certain set of search criteria has been previously used, the server may choose not to perform the query again. Rather, the server may opt to provide the user the results of the previous query.

It should be recognized that the query need not occur at a dedicated server, such as the Media Database Server 203 in FIG. 2. Rather the process may be distributed among multiple sources information regarding media content. For example, television content could be queried from the cable or satellite provider's server, or the program guide made available to the user by a cable or satellite provider. This program guide may also be resident on the user's DVR. In the case that the user's DVR is directly connected to the Internet, the DVR may be directly queried for Internet related content without the involvement of cable provider servers or databases. Similarly, radio content may be obtained from servers dedicated to radio information. Content for mobile devices, such audio, video and text that can be displayed on the mobile device, can be queried from across the Internet. Applications for mobile devices, such as programs, can be queried from those entities which regularly provide mobile device applications, or organizations that test, review and publicize such applications. It should be understood that these databases may be affiliated or unaffiliated. In the case that they are unaffiliated, a primary server is used to coordinate communication to the servers and aggregating results of the parallel queries. It should also be understood that this process can occur at the same time the user requests and receives an original web article, after the user has explicitly chosen to receive related content, or using other variations with respect to when the process occurs.

Figure 6:
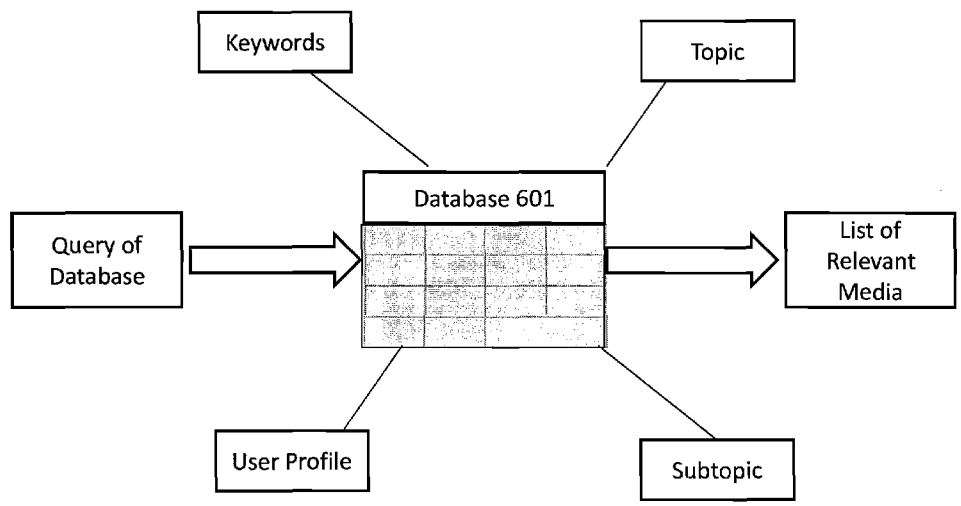
FIG. 6 is a diagram illustrative of the process of querying the database for related content in accordance with an embodiment of the invention.

FIG. 6 graphically depicts the method by which the media database may be queried to provide a list of related content to the user. A number of criteria, such as the topic of the article being viewed by the user, subtopics and keywords from the article, may all be used query database 601. In addition, the query may take into account a "user profile," which may contain information specific to the user, such as may contain the user's interest and hobbies, occupation, location, or statistical information regarding prior media viewed by the user. The user profile can either be set by the user when the first obtain related content. The user profile can later be recalled to be used by a query through typical means, such as the entry of a login and password, or through the use of data saved by the user's Internet browser. In addition, the user's Internet Service Provider can use their unique Internet Protocol address, or an alternate network identifier to determine the user querying information. A query of database 601 making use of all, or any subset of these criteria, will yield a display of related content to be provided to the user. In addition, the query may take at the time the user first loads an online article into his web browser or Internet capable device or after the user has explicitly requested related content.

FIG. 7 depicts the user's ability to remotely record related content automatically in accordance with an embodiment of the present invention. The user is provided the option to set their DVR, from their computer, using button 701. It should be understood that button 701 may be a button, or any other equivalent graphical interface allowing a user to make a selection, such as a link, icon, radio button, drop down box. It should be understood that FIG. 7, and button 701, can be made available to the user on a computer, smart phone or any other device capable of accessing the Internet and providing web content. It should also be understood that the user may set recordings with any sort of personal recorder available for a given platform. For example, a user may be able to record a television program using a DVR or personal digital recorder, an online video clip, or audio clip to their computer's hard drive, or a radio broadcast using a digital radio recording device. Similarly, a user may be given the option to download content or applications to their mobile phone or smart phone.

Figure 8:
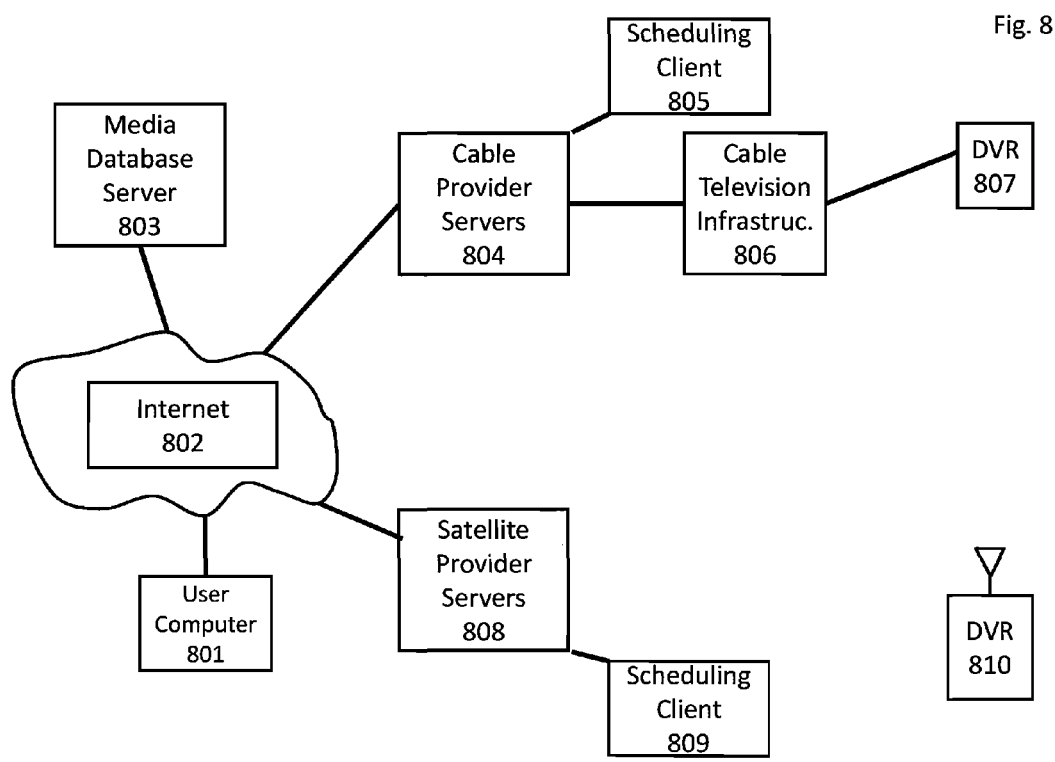
FIG. 8 illustrates a network that can be used to remotely record related content, consisting of television broadcasts, using a digital video recorder in accordance with an embodiment of the invention.

FIG. 8 is a diagram of a network that may be used to remotely set the user's DVR to record related content. When related content is provided at a computer, such as computer 801, a request is forwarded across Internet 802 to Media Database Server 803. Media Database Server 803 queries a database of media content, using the method depicted in FIGS. 5 and 6 and the associated disclosure above, and returns a display of related media to user computer 801. If the user chooses to remotely record one of the related television broadcasts, a message is sent to the user's television provider. For example, in the case that a user obtains television broadcasts from a cable provider, a message to record related content is sent from user computer 801, across Internet 802, to Cable Provider Servers 804. Cable Provider Servers 804 then use scheduling client 805 to determine if the program can be recorded. Each user's cable or satellite provider maintains a unique profile for their DVR, including the programs that are available to be recorded, and the programs currently scheduled to be recorded. In order to access this profile, a form of user identification such as a login or password may be required. This information may be entered by the user in configuring their computer to see related content, or at the time they first record related content, and saved by the user's web browser for reuse each time a request to record content is made. The identification information may also be determined based on the user's IP address. This reuse eliminates the need for the user to enter a login and password or any other identification each time they choose to record related content. In addition, this information may be linked to the user profile described above. Upon login, DVR Scheduling client 805 examines the user profile to determine if the present request to record a program can be fulfilled. It should be understood that the scheduling client can be resident in any number of places, including distributed across numerous servers, or on the user's DVR. DVRs are often prevented from recording additional programs, either due to a program that was previously scheduled to be recorded at the same time and a finite number of tuners, or a lack of available storage space. In the case that a scheduling conflict exists, a message can be sent from Scheduling Client 805, through Cable Provider Server 804, and across Internet 802 to user computer 801. This message can indicate to the user that a scheduling conflict exists. Accordingly, the user is given the option to address the conflict by choosing to record either the previously scheduled recording, or their present request. Similarly, if a conflict exists due to a lack of storage space, the user is given the option to delete previously recorded programs to make storage available.

Figure 9:
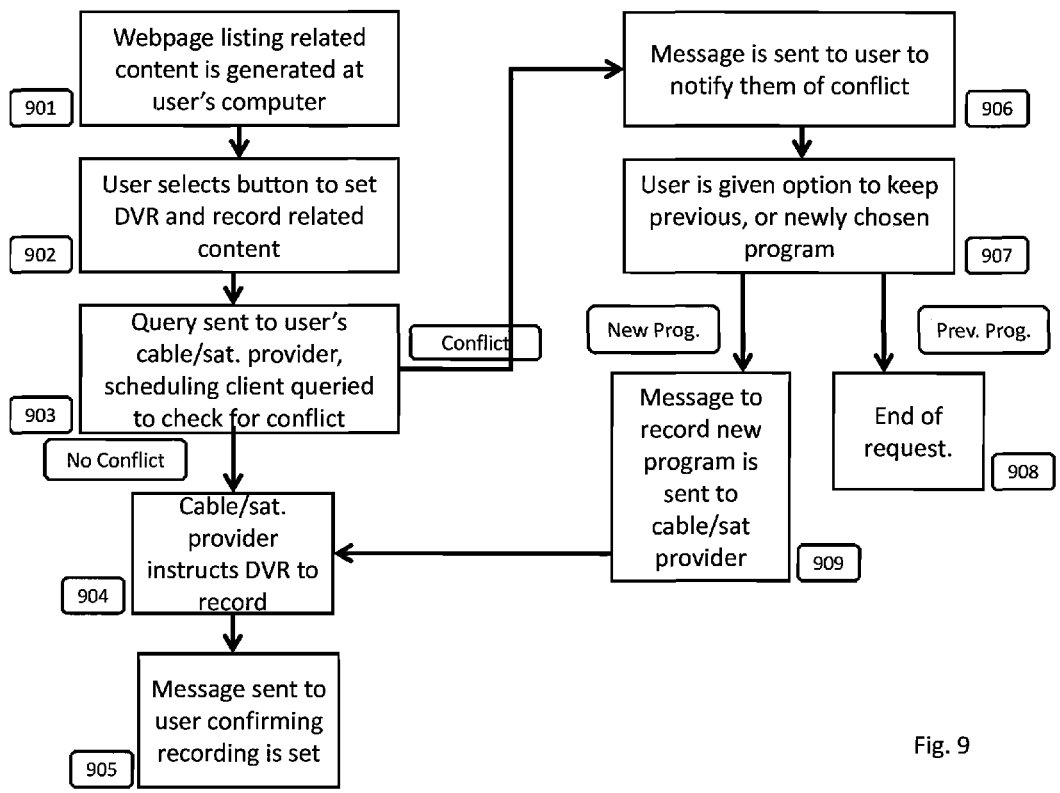
FIG. 9 is a flow chart of illustrative steps involved in recording related television content using a digital video recorder, in accordance with an embodiment of the invention.

The network of FIG. 8 may be used to remotely set the user's DVR to record related content across platforms using the illustrative steps of FIG. 9. At step 901, the user has been provided a display listing content across platforms, including television programs, as previously described with respect to FIG. 7 above. In the case the user selects the set DVR button, at step 902, a message containing the details of the program the user wishes to record, such as broadcast channel, time and duration, is sent to the user's cable or satellite provide. This message is then used, at step 903, to query the scheduling client. At this step, user information such as login and password, or cable or satellite account information, may be used to determine the current programs set to be recorded by the user's DVR. The scheduling client determines whether a conflict exists, such as a previously set recording which is scheduled to take place at the same time as the new request. If such a conflict does not exist, the request to record the related content is executed at step 904, and the cable or satellite provider sets the user's DVR to record the requested content. This request can be sent through a number of methods, including the television provider's infrastructure (e.g., cable television infrastructure, or satellite dish infrastructure), or can be sent over the Internet if the DVR has direct access to the Internet. Once the recording is set, a confirmation message may be sent to the user as indicated in step 905. If a conflict does exist, such as a previously set recording, the user is sent a message as indicated at step 906. The user is then given the option to keep either the previously scheduled recording, or to delete this previously scheduled recording and to set the newly requested program to be recorded. In the case the user chooses to keep the previously scheduled recording, the process ends, as depicted at block 908. If the user chooses to discard the previously scheduled recording, and instead record the newly requested program, an appropriate message is sent to the users' cable or satellite provider and the DVR is set accordingly. In addition, a program can typically have a scheduled broadcast time to viewers, as decided by the broadcast channel or station, but programs without specified start times can also be incorporated into embodiments of the present invention.

Figure 10:
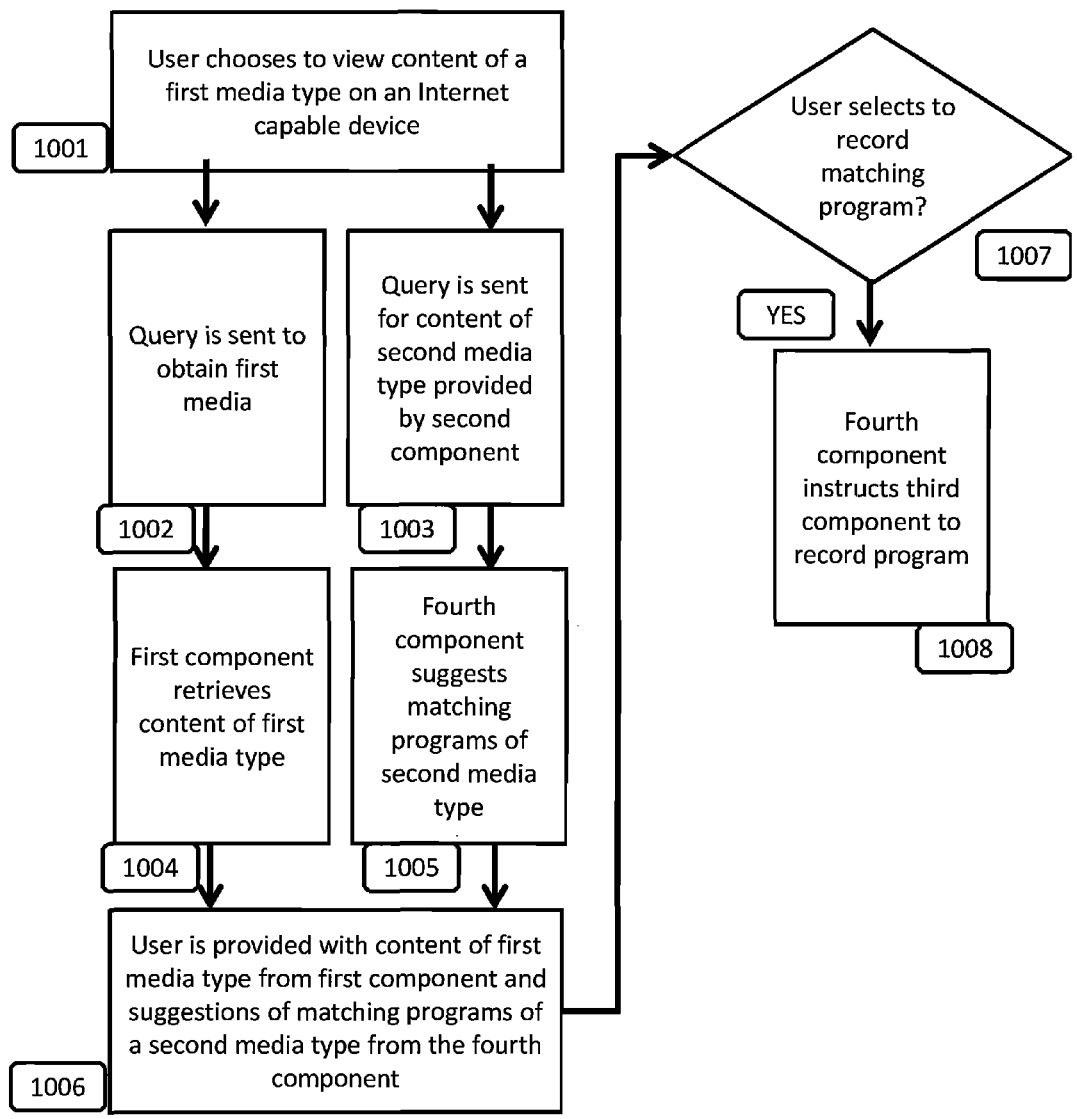
FIG. 10 is a flow chart of illustrative steps in accordance with an embodiment of the invention.

FIG. 10 provides illustrative steps involved in obtaining and recording related content across platforms, in accordance with an embodiment of the invention. At step 1001, the user chooses content of a first media type on a device capable of accessing the Internet. The first media type can consist of web content, examples of which include online news articles and blogs. The first component retrieves, delivers, or displays the web content from web servers over the Internet in response to the user's request. The first component can consist of the user's computer, smartphone or any other device capable of accessing the Internet, as well as software capable of presenting online content such as a web browser. In some embodiments, the first component can include the source of content, such as the server(s) which hosts the first media the user wishes to view, such as the servers used by CNN.com to host online news content. At step 1003, a search or query is performed to find matching content of a second media type (e.g., video or solely video). Content of the second media type may include television programming, radio broadcasts. Content of the second media type can also include or consist of content that may be viewed on a mobile device. Content of the second media type is provided by the second component. The second component may consist of all the elements necessary to provide the second media content, examples of which include television channels, or radio stations. The second component may be maintained by a cable or satellite provider, a television network or radio station, or any other party providing the second media type. In some embodiments, the second component can include tuning or receiving devices and/or related software applications such as a television set top box, television tuner, interactive television program guide, or similar such devices and/or software. In some embodiments, the second component may be client side equipment (hardware and/or software), content provider side equipment (e.g., cable headend, TV provider servers, ISP equipment, etc.) or combinations thereof.

The second component may be accessed, and its content may be recorded, by a third component. Examples of a third component include a DVR, a personal digital video recorder or an equivalent device. At step 1004, the first component retrieves the sought after content of a first media type. Simultaneously, at step 1005, the fourth component suggests matching components to the user. The fourth component, which searches for matching programs of the second media type, can consist of both software and hardware necessary to find matching programs. Examples of this include software for querying a database on a server, which may be resident on the user's local device, or on a remote server. In addition, the fourth component may include the servers, computers and other hardware necessary to perform a search of a program schedule and return matches. At step 1006, content of the first media type and suggestions of matching programs of a second media type are provided to the user. If desired, the fourth component can be configured to have a preset programs associated with individual web content (e.g., different sets of programs for different web content). Also, if desired, the fourth component can configured to have a data feed for receiving a set of program suggestions that are generated from different third party servers. In addition, the fourth component provides the user a selectable option that when selected, programs the third component to record the suggested matching programs. Accordingly the fourth component may include software necessary to program a DVR or equivalent device. This software may be resident on the user's local device, on a remote server, on the third component, or any combination thereof. If the user selects the user-selectable option for a suggested matching program at step 1007, the fourth component instructs the third component to record the particular program (e.g., sends a signal such as a packet with program related data to the user's set top box, to the user's television service provider, or to a channel subscribed by the user). In one embodiment in accordance of the present invention, the user that selects the user selectable option at step 1007 and instruct their DVR to record a television program.

Figure 11:
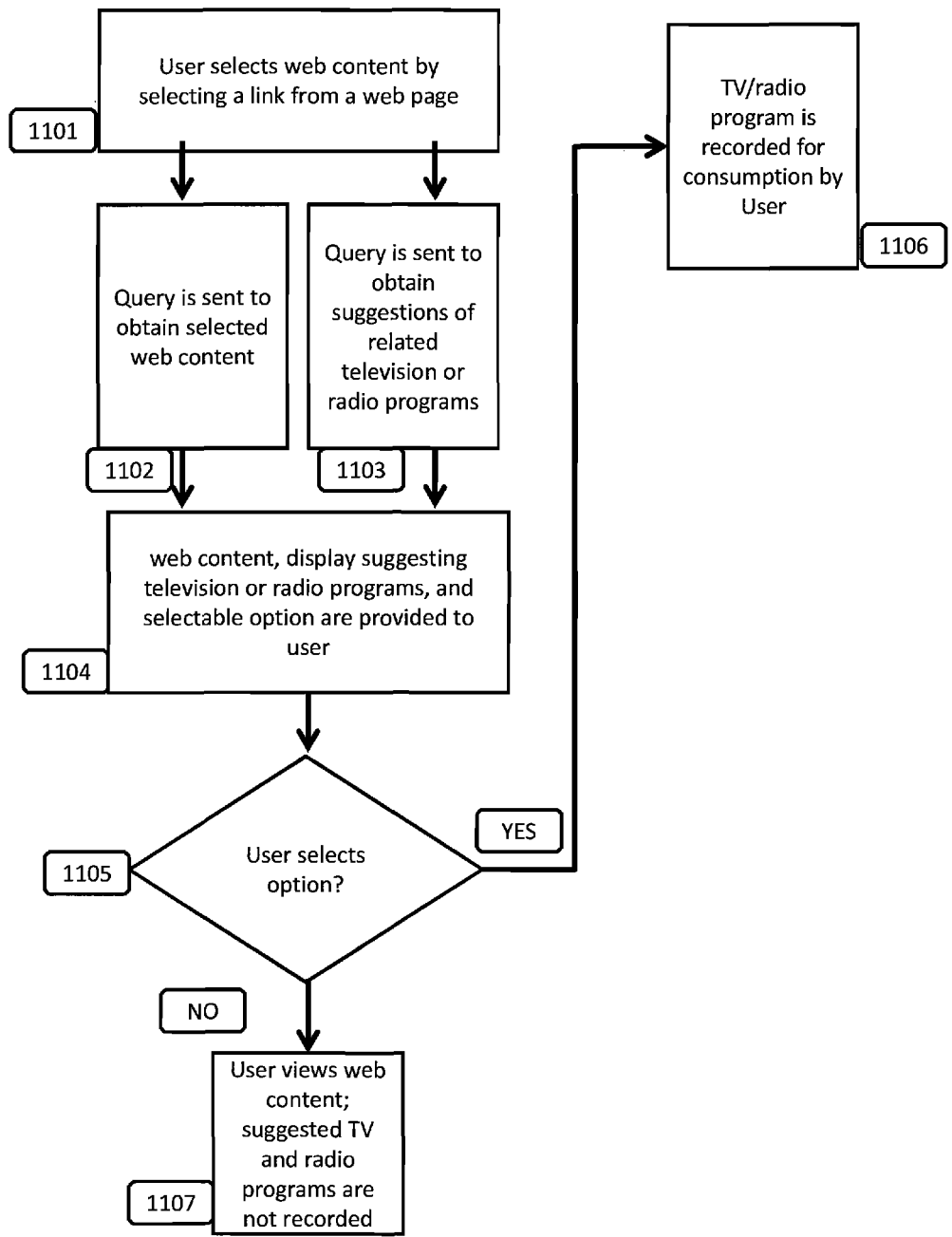
FIG. 11 is a flow chart of illustrative steps in accordance with an embodiment of the invention.

With reference to FIG. 11, a second diagram provides illustrative steps in accordance with an embodiment of the present invention. At step 1101, a user on a device capable of accessing the Internet selects a link on a web page to view particular web content. A query is sent to web servers to obtain the particular web content at step 1102. Simultaneously, at step 1103, a query is sent to obtain one or more television or radio programs related to the web content selected by the user at step 1101. The selected web content, and suggested television or radio programs are then provided to the user at step 1104. In addition, the user is provided a selectable option connected to the user's personal digital video recording device, DVR or similar device. If the user selects this option for a particular suggested television or radio program at step 1105, a command is sent to the personal digital video recorder, and the program is recorded at step 1106. In some embodiments software and hardware is configured to connect the user's web browsing (e.g., over user selected sites over the Internet) to the user's personal video recording device or service. For example, any member of a household surfing content from inside the house or outside can add a program to their own household's cable television DVR recordings by selected a suggest program using embodiments of the present methods and systems. If the user does not select the option, he views the originally selected web content, but does not record any suggested programs, as in step 1107.

Figure 12:
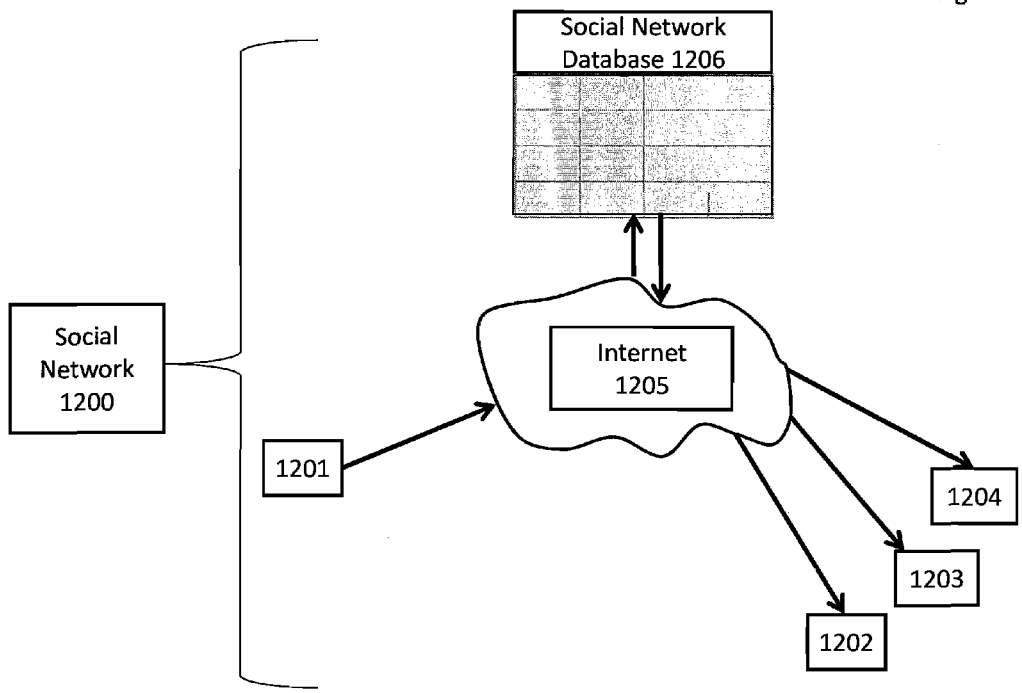
FIG. 12 illustrates an online social network.

With reference to FIG. 12, the user is also given the option to send or post a message regarding related content to members of a social network. Programs such as Facebook and Twitter allow users to send text based, or photo based messages to other individuals on the social network. In one implementation consistent with the present invention, users are given the ability to post or send a message suggesting media content to members of a social network. Members who can view or receive a message with suggested media may seamlessly set their DVR or other recording device to record the content in the message. FIG. 12 depicts a social network. Members 1201, 1202, 1203 and 1204 are able to interact with the network through devices such as computers and smart phones, which can access Internet 1205. When members log on to the social network, they are given access to Social Network Database 1206. It should be understood that Social Network Database 1206 may be a single database or multiple databases, and may reside on a single server or on a number of servers which interacts to present a single interface to the user. If user 1201 sends a message on the social network to users 1202, 1203, and 1204, that message is sent via Internet 1205 to social network database 1205 where it may be stored. It can then be designated for users 1202, 1203 and 1204, such that when they log onto the social network, the message will be retrieved, and displayed on the device used to access the Internet 1205 and social network 1200. In the alternative, the message may be delivered to users without the need to log onto the social network. Social network database 1206 could send an e-mail, text message or similar communication to users 1202, 1203 and 1204, either containing user 1201's message, or alerting them that user 1201 has sent a message.

Figure 13:
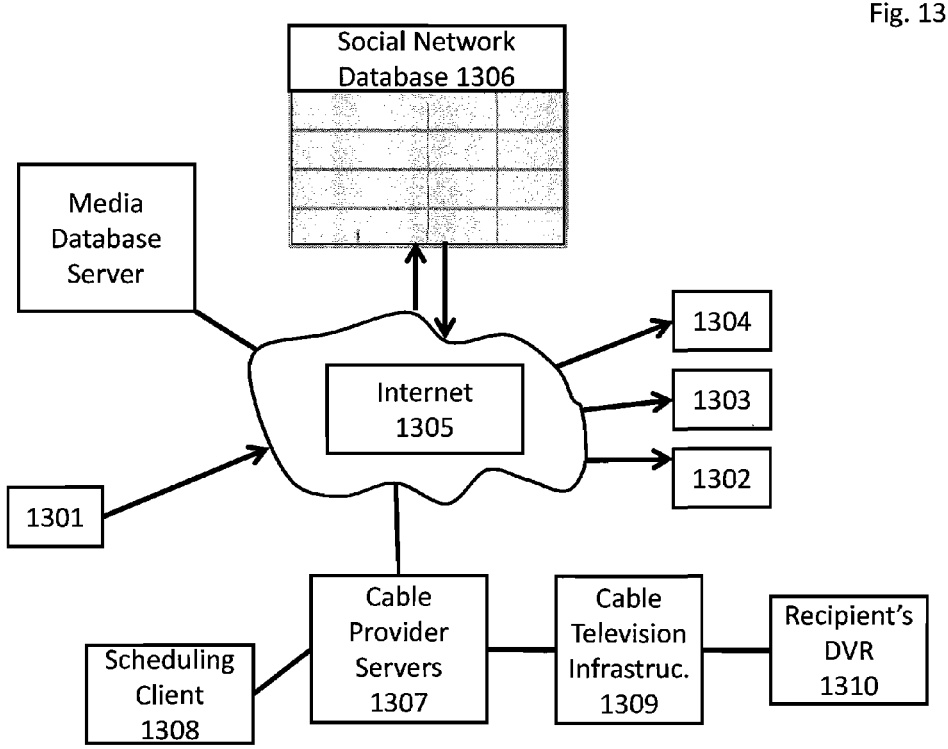
FIG. 13 illustrates the broadcast of media to members of a social network in accordance with an embodiment of the invention.

Referring to FIG. 7, the related media provided to the user is accompanied by a "blast" button. It should be understood that this button could be replaced with any equivalent which allows the user to select an option, including a link, radio button icon or hot key combination. In addition, this button could be placed in the same Internet browser as the related content, an additional tab or Internet browser window, within the menu or panels of the user's Internet browser or a dashboard associated with the user's Internet Browser. By selecting the blast option, the user can notify members of the social network about an item of related content, such as a television show or radio program. The message can be sent to all or any subset, of the members of the social network to which the user is connected on the social network. This message can also be sent to a subset of social network members based on the members' expressed interests, such as groups within the network they have joined, or based on criteria, such as age, hobbies, occupation, schools attended, geographic location or political affiliation. For example, user 1201 could send his message about a particular television program to users 1202, 1203 and 1204, or to just users 1202 and 1203. Similarly, the message could be sent just to those users that attended the same university as user 1201. The message can consist of text entered by the user, and may include a button, link or other similar graphical tool. In addition, the message can contain details regarding the suggested program, such as a title, description and date and time of broadcast. In addition to being able to view the suggested content, the recipients of the message are able to automatically record or download the content. The button, link or similar tool for selection within the message allows the recipient to select and record the suggested content. In the case that the message relates to a television broadcast, the recipients may set their DVR, using the techniques described above in relation to FIGS. 8 through 11. FIG. 13 depicts an implementation, in which a social network, a second media content provider and a user's DVR may interact, and allow the user to record media content suggested over a social network.

It should be understood that these techniques are equally applicable to posts on a social network. Members of social networks are given the opportunity to post to their profile site, make comments on the posts and pictures of other members, or have public conversations that can be seen by other members of a social network. In an implementation in accordance with the present invention, these posts and comments can include suggested media. In the same manner as discussed above for messages, users viewing posts or comments containing suggested media can use the included link, button, or equivalent to automatically set their DVR. These posts may also be brought to the attention of an individual on a social network using features such as Facebook's "NewsFeed" which display regular updates of posts and comments of all the members of the network to whom the individual is connected.

Referring to FIG. 14, the list of content suggested to the user can be cumulative, and saved for later viewing or recording. Each time a user receives suggested related content, the newly recommended items may be added to the existing items on a running list, creating a "media queue." FIG. 14 depicts a webpage displaying the media queue of a user, in accordance with an embodiment of the present invention. This media queue can provide the user reminders when upcoming programs are going to be broadcast, or when programs the user has set to be recorded have actually been recorded. Since the media queue is user specific, it can be connected to the user profile described above. This login and password can be used to access the media queue at any time. In addition, the media queue allows the user to track and rate content consumed by the user. These ratings can be used to refine future searches for matching programs. The media suggestions produced will accordingly increase in accuracy over time. By aggregating media suggested to the user, the media queue also provides the user the option to set their DVR or personal digital video recorder, or suggest content to members of a social network, at a time after the content has first been suggested. The media queue can also provide the user the ability to search past or future content based on first suggested programs. This search can be conducted using search functionality of the media queue, or through a conventional Internet search engine, such as Google or Yahoo. The user can search, using either the show title, celebrities, or personalities associated with the content, or by using any other criteria that may be associated with the show. Upon performing the search, the user will receive a list of results. The user can then select to add the search results to their media queue and record the program. For example, if upon viewing a webpage, a first program is suggested to the user, the user can then search for additional episodes of the suggested program, or programs similar to the suggested program. The search will return second suggested programs. The searches can be restricted by platform (online video clips, television programs, radio broadcasts), time at which they are to be broadcast or released, and any other criteria which allows the user to better filter content. The searches can take place using a media database, as discussed above and detailed in FIG. 6. Both the first and second suggested programs can then be added to the user's media queue, as detailed in FIG. 14. The user may also automatically record these results, using a link, button or similar tool, using the same procedures discussed above with respect to FIGS. 1 through 9. In addition, other search tools, including conventional search engines such as Google or Yahoo, may be used to investigate related content. For example, a user could type the name of a television show into a search engine, and receive a set of links related to the television show, including actor profiles, fan webpages, as well as links to content, such as past and future episodes. The present system allows the user to then select the links to content and automatically record the associated television programs to their DVR, or similar device, using the techniques described above and detailed in FIGS. 1 through 9. The links which allow for automatic recording can be provided in the same format as links to webpages, or may be made identifiable by any one of a number of visual queues, such as unique text, font, or placement on the user's screen. In addition, the links which provide automatic recording functionality may simultaneously link to both related content, and webpages. Software resident on the user's computer allows users to take advantage of this dual functionality by clicking on the link conventionally to select the webpage, and using additional key strokes, such as a right click or menu selection, to take advantage of the automatic recording functionality. This functionality may also be integrated into software platforms which support video content, such as YouTube. A search in YouTube could return links to online video clips, as well as links that allow the user to record content automatically to their DVR.

It should be noted, that since the Internet and social networks are accessible by mobile devices such as smart phones, users will be able to use these devices to view, record or save content. In addition the content will also be added to the user's media queue. Accordingly, if the message recipient views the suggested content on their mobile device, but chooses not to set their DVR, they can return to their media queue at a later time and choose to record the content.

In addition, some message formats do not allow extensive text or graphics. For example, the social network Twitter limits users to messages that are 140 characters in length, and consist of only text. In this instance, the message can be accompanied by additional data, which is not visible to the user, but that denotes that the message is meant to offer the recipient the opportunity to record related media. The software application which is used to receive and read the message may detect this additional data and prompt the user to remotely record the suggested programming. The additional data could come in the form of flag bits at the end of the message, or in any other form that alerts the software application to the fact that the message has related content associated with it. Upon seeing this flag or equivalent marker, the software program that receives the data can provide the user a selectable button, similar to that disclosed in FIG. 7, to automatically program the user's DVR to record the specific suggested program.

In some implementations, the user is given the ability to locally program a DVR. If the user is attempting to set their DVR to record related content using a portable computer, the portable computer can act as a remote control. This method bypasses the need to access the Internet and send messages to the cable or satellite provider. In this instance, the user's portable computer may be outfitted with an infrared LED and control software for controlling such a LED. This may come in the form of a peripheral device, such as attachable antenna which produces infrared, or similar electromagnetic waves to control appliances and electronics such as televisions, radios and DVRs. In addition, the control software may provide the look and feel of a traditional remote control, including a graphical user interface complete with buttons and dials. Such peripheral antennas and control software are currently commercially available. For example, the Red Eye, by ThinkFlood, allows users to turn an IPod or IPad (by Apple) into a remote to control electronic devices such as televisions, radios and DVRs. If desired, a message can be sent through the Internet to the users DVR device or service that programs the user's personal DVR device or service in accordance with the specifics of the selected program. If desired, a cache of suggested programs is accessible to a user's personal interactive television program guide, and the guide uses the cache to assist the user when the user is searching for programs in the guide. For example, as the user is searching using program names or theme, the guide can access the cache in parallel to predict the program the user is search for and display the prediction to the user for selection (e.g., for viewing or recording).

As previously explained, when a user is provided a list of related content, they are provided the option to record this content. On a portable device, rather than send a message to the cable/satellite provider's server, the user may be prompted with a dialog box, a query box, or an equivalent graphical tool, to ask if he/she wishes to program their DVR locally. If the user selects to locally program the DVR, software which allows the portable computer to act as a remote control will be initialized. In the alternative, the portable computer may automatically work to program the DVR locally when the user selects to record related content. In this instance, software can be used to allow the Internet browser to interact directly with the control software described above. This will allow the DVR recording to be set without the use of a query box or other intermediate steps to determine if the user wishes to program the DVR locally.

It should also be recognized that the above discussions with regards to DVRs are equally applicable to other devices which manipulate media content. For example, the Slingbox is a product which allows users to stream content from their cable provider, or their DVR at home, to any location in which an Internet connection is available, including mobile devices. The present system could be used to set the Slingbox or an equivalent product, to prompt the user when new media content is about to be broadcast live, or has completed being recorded by the user's DVR. This prompt will appear on the user's mobile device, allowing them to take advantage of the ability to remotely view recorded content even when they are not in the presence of their computer or DVR.

In addition, one purpose of the foregoing is to ease the difficulty of aggregating modern media. At present, individuals may have to switch between video sources or inputs on their television to view television, video, or Internet content. For example, the user would not have to press the video source button on their television multiple times to view content from different platforms. Rather, by selecting the suggested program, the user can pull the program into the program guide and DVR, including the programs metadata such as rating, cast, or plot into the user's local program guide. In some embodiments described herein, a program selected to be recorded can include metadata (e.g., provider, rating, cast, etc.) that was not previously present through the user DVR or program guide, which is added to the guide or DVR when the program is added to be viewed or recorded through the consolidation point for media. The presented technology can be used to aggregate media from different sources into a single source, such as a user's cable television program guide and or related DVR.

Processes described herein can be implemented using computer executable instruction stored on computer readable medium located at one or more location, and which executed carry out the operations illustratively described herein on one or more devices.

The foregoing is merely illustrative of the principles of the invention and various modifications can be made by those skilled in the art without departing from the scope and spirit of the invention.

What is claimed is:

1. A method displaying to a viewer television programs related to media content of interest, wherein all steps are carried out by one or more computers on a network, which method comprises:
   providing the media content of interest on a webpage displayed by the viewer's Internet web browser, wherein the media content of interest includes a discussion of one or more particular topics;
   identifying on the webpage contextually with the media content of interest one or more television programs related to the one more particular topics by cross-referencing the one or more particular topics with a database of television programs; and
   providing a link on the webpage, wherein activation of the link causes the one or more television programs to be recorded or displayed to the viewer.

2. The method of claim 1 wherein the identifying includes a time of broadcast for the one or more television programs and the method further comprises allowing the viewer to download the broadcast time to allow the viewer to view or record the one or more television programs.

3. The method of claim 2, wherein the downloading of the broadcast time communicates with a digital video recorder and arranges for the digital video recorder to automatically record the program.

4. The method of claim 1, wherein the identified one or more television programs are of a media format that is different than a media format of the media content of interest.

5. The method of claim 1, wherein at least one of the television programs is a video clip associated with the media content of interest, and the method further comprises prompting the viewer to view the video clip when it is available online.

6. The method of claim 1, further comprising communicating with a digital video recorder and arranging for the digital video recorder to automatically record the identified one or more television programs.

7. The method of claim 1 wherein the television show related to the particular topic displayed by the viewer's Internet web browser is sent to a user's smart phone.

8. The method of claim 1 which further comprises forwarding the identified programs(s) to members of a social network.

9. The method of claim 8 which further comprises the use or members of the third party social networking website programming a digital recording service to record video or audio content at a scheduled broadcast time.

10. The method of claim 9, which further comprises:
providing the user the ability to search for additional television radio programs similar to the suggested television or radio content;
returning one or more second suggested television or radio programs based upon the user's search; and
allowing the user to add the first suggested and second suggested television and radio programs to a list of media to be provided to the members of the third party social networking website.

11. The method of claim 8 which further comprises allowing the members of the third party social networking website to automatically add the identified one or more television programs to a media queue.

12. The method of claim 8, wherein the identifying includes a time of broadcast for the one or more television programs and the method further comprises allowing at least one of the members of the third party social networking website to download the broadcast time so that the one or more television programs can be viewed or recorded.

13. The method of claim 1, which further comprises posting information related to the one or more television programs on a third party social_ networking website, whereby members of the third party social networking website can access the information.

14. A method for displaying to a viewer television programs related to media content of interest, wherein all steps are carried out by one or more computers on a network, which method comprises:
providing the media content of interest on a webpage displayed by the viewer's Internet web browser, wherein the media content of interest includes a discussion of one or more particular topics;
identifying on the webpage and contextually with the media content of interest a broadcast stream for a future showing of one or more programs to the viewer, wherein the one or more programs are related to the one or more particular topics and the identifying is achieved by querying a database for programs related to the one or more particular topics;
displaying an icon notifying the viewer of a broadcast time of the one or more programs; and
providing a link on the webpage, wherein activation of the link causes the one or more programs to be recorded or to be displayed to the viewer if the broadcast time has passed.

15. The method of claim 14, which further comprises allowing the viewer to download the broadcast time to allow the viewer to view or record the one or more television programs.

16. The method of claim 14, which further comprises posting information relating to the one or more programs on a third party social networking website, whereby members of the third party social networking website can access the information.

17. An apparatus for increasing television ratings comprising:
a webpage comprising:
media content of interest displayed on a viewer's Internet web browser, the media content including a discussion of a particular topic;
at least one link to a television show related to the particular topic, the link being displayed contextually with one or more particular topics related to the media content of interest and, when activated, causing the television show to be recorded or displayed to the viewer;
a digital video recorder capable of being programmed by a remote control;
a portable computing device comprising:
a housing;
a user interface including an I/O surface;
software which allows the computer to act as a remote control for audio visual devices;
software which allows the viewer to browse the Internet utilizing the Internet web browser;
software which using the link to query a database, identifies television shows associated with the particular topic; and
software which sets the digital video recorder, by acting as a remote control, to record the television show related to the particular topic.

18. The apparatus of claim 17 in which the software which sets the digital video recorder prompts the user before choosing to record each television show related to the particular topic.

19. The apparatus of claim 17, wherein the portable computing device further comprises software operable to post the at least one link to the television show on a third party social networking website, whereby members of the third party social networking website can access the link.

20. A system comprising: an Internet accessible device programmed to provide to users content of a first media type retrieved from different content providers over the Internet by web servers, wherein the content of the first media type includes a discussion of one or more particular topics is displayed by a viewer's Internet web browser, the Internet accessible device also displaying a user selectable option with the content;
provider side equipment to provide content of a second media type comprising scheduled media programs;
a recording device, the recording device automatically recording programs from the provider side equipment when the user selectable option is activated; and
a programmable searching device that in response to a user selecting to retrieve content from different web content providers, suggests matching programs to the user contextually with the one or more particular topics.

21. The system of claim 20, wherein information relating to the matching programs is posted on a third party social networking website, whereby members of the third party social networking website can access the information.

* * * * *

UNITED STATES PATENT AND TRADEMARK OFFICE
CERTIFICATE OF CORRECTION

| | | |
|---|---|---|
| PATENT NO. | : 9,009,770 B2 | Page 1 of 1 |
| APPLICATION NO. | : 12/944571 | |
| DATED | : April 14, 2015 | |
| INVENTOR(S) | : Wellen et al. | |

It is certified that error appears in the above-identified patent and that said Letters Patent is hereby corrected as shown below:

In The Claims

Column 12:
Line 38 (claim 1, line 11), after "related to the one", insert -- or --.

Column 13:
Line 30 (claim 13, line 3), change "social_networking" to -- social networking --.

Signed and Sealed this
Thirteenth Day of October, 2015

Michelle K. Lee
*Director of the United States Patent and Trademark Office*